United States Patent
Voelz et al.

(10) Patent No.: US 8,845,029 B2
(45) Date of Patent: Sep. 30, 2014

(54) BACKREST ADJUSTMENT DEVICE FOR A VEHICLE SEAT OR A VEHICLE BENCH SEAT

(75) Inventors: Reimer Voelz, Ruesselsheim (DE); Juergen Maier, Weitersweiler (DE); Kirsten Huber, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 13/441,530

(22) Filed: Apr. 6, 2012

(65) Prior Publication Data

US 2012/0256461 A1  Oct. 11, 2012

(30) Foreign Application Priority Data

Apr. 9, 2011 (DE) .......................... 10 2011 016 646

(51) Int. Cl.
*B60N 2/02* (2006.01)
*B60N 2/235* (2006.01)
*B60N 2/22* (2006.01)

(52) U.S. Cl.
CPC ............... *B60N 2/22* (2013.01); *B60N 2/2356* (2013.01); *B60N 2/0224* (2013.01)
USPC ............................................. 297/362.11

(58) Field of Classification Search
USPC ............... 297/362.11, 362, 361.1, 362.12, 297/367.12, 378.1, 378.12
See application file for complete search history.

(56) References Cited

U.S. PATENT DOCUMENTS

| | | | | |
|---|---|---|---|---|
| 3,427,073 A * | 2/1969 | Downs et al. | ............. | 297/362.11 |
| 5,123,706 A * | 6/1992 | Granzow et al. | ......... | 297/452.18 |
| 5,292,178 A * | 3/1994 | Loose et al. | ............... | 297/344.1 |
| 5,393,123 A * | 2/1995 | Hernandez et al. | ...... | 297/378.12 |
| 5,435,624 A * | 7/1995 | Bray et al. | ............... | 297/362.11 |
| 5,483,853 A * | 1/1996 | Moradell et al. | ......... | 74/665 GD |
| 5,702,155 A * | 12/1997 | Ito | ............. | 297/362.11 |
| 5,711,577 A * | 1/1998 | Whalen | ..................... | 297/361.1 |
| 5,918,943 A * | 7/1999 | Mitschelen et al. | ..... | 297/452.18 |
| 6,000,757 A * | 12/1999 | Sovis | ......................... | 297/344.1 |
| 6,040,533 A | 3/2000 | Wagner | | |
| 6,331,034 B1 * | 12/2001 | Specht | ..................... | 297/362.11 |
| 6,464,297 B2 * | 10/2002 | Garrido et al. | ........... | 297/354.13 |
| 6,629,732 B1 * | 10/2003 | Ursel et al. | ............... | 297/362.11 |
| 6,893,092 B1 * | 5/2005 | Krambeck | ................ | 297/362.11 |
| 7,118,178 B2 * | 10/2006 | Daniels | ..................... | 297/378.1 |
| 7,152,922 B2 * | 12/2006 | Garland | ................... | 297/362.11 |
| 7,425,038 B2 * | 9/2008 | Deptolla | ................... | 297/362.11 |
| 7,500,719 B2 * | 3/2009 | Kojima | ........................ | 297/362 |
| 8,052,215 B2 * | 11/2011 | Ito | ........................... | 297/362.11 |

(Continued)

FOREIGN PATENT DOCUMENTS

DE 4211428 A1 10/1993
DE 29500869 U1 2/1996

(Continued)

*Primary Examiner* — Jose V Chen
(74) *Attorney, Agent, or Firm* — Ingrassia Fisher & Lorenz, P.C.

(57) ABSTRACT

A backrest adjustment device is provided for a vehicle seat or a vehicle bench seat, in particular for a motor vehicle seat or a motor vehicle bench seat, in which a backrest part is connected to a seat part via an adjustment and fixing device, which has a fixing, which is disengaged for the inclination adjustment of the backrest part, the fixing of the adjustment and fixing device being disengaged by an electromechanical actuator.

14 Claims, 6 Drawing Sheets

(56) References Cited

U.S. PATENT DOCUMENTS

| | | | |
|---|---|---|---|
| 8,434,823 B2 * | 5/2013 | Du et al. | 297/362.11 |
| 8,443,690 B2 * | 5/2013 | Koga | 74/425 |
| 2007/0200408 A1 * | 8/2007 | Ohta et al. | 297/362.11 |
| 2010/0038948 A1 * | 2/2010 | Pigeon | 297/362 |
| 2010/0170354 A1 | 7/2010 | Haraguchi et al. | |

FOREIGN PATENT DOCUMENTS

| | | |
|---|---|---|
| DE | 10012758 A1 | 9/2001 |
| DE | 102005052201 A | 5/2007 |
| DE | 202006016288 U1 | 10/2007 |
| DE | 102006028648 A1 | 12/2007 |
| DE | 102006041217 A1 | 3/2008 |
| DE | 102006054855 A1 | 5/2008 |
| DE | 102007017672 A1 | 10/2008 |
| DE | 202009010305 U1 | 10/2009 |
| WO | 9305982 A1 | 4/1993 |

* cited by examiner

BACKREST ADJUSTMENT DEVICE FOR A VEHICLE SEAT OR A VEHICLE BENCH SEAT

CROSS-REFERENCE TO RELATED APPLICATION

This application claims priority to German Patent Application No. 10 2011 016 646.7, filed Apr. 9, 2011, which is incorporated herein by reference in its entirety.

TECHNICAL FIELD

The technical area relates to backrest adjustment devices for vehicle seats or vehicle bench seats.

BACKGROUND

A vehicle seat or a vehicle bench seat has a seat part and a backrest part. The seat part generally defines a horizontal seat section having a seat surface, in order to carry a vehicle occupant. The backrest part generally defines a vertical seat section having a backrest surface, in order to support the back of an occupant. The backrest parts are generally adjustable in the inclination in relation to the seat part by an inclination adjustment unit, in order to be able to adapt the vehicle seat or the vehicle bench seat to the anatomy of the occupants.

It is generally known that joint fittings are used to adjust the inclination of the backrest part, which have a fixed joint component assigned to the seat part and a pivotable joint component assigned to the backrest part. The fixed joint component and the pivotable joint component are connected to one another via a pivot axis. The pivot axis of the joint fitting arranged on a seat longitudinal side is typically coupled to the joint fitting arranged on the opposing seat longitudinal side via a backrest adjustment shaft, which transmits a torque of one joint fitting to the other joint fitting.

In order to adjust and lock the location of the fixed joint component and the pivotable joint component to one another, an adjustment and fixing device is provided. This is typically actuated by hand and has an actuating lever or a hand wheel for this purpose on the outer seat longitudinal side. The actuating lever or the hand wheel disengages a fixing of the backrest adjustment shaft, whereby the backrest part can be pivoted.

The arrangement of the actuating levers or hand wheels requires space, the space requirements competing with those of other functional parts of the vehicle in the area of the outer seat longitudinal side. Components in the lateral area are, for example, storage compartments or protective devices, such as side airbags, which are arranged on the vehicle side walls or vehicle doors. In order to ensure improved personal protection of the vehicle occupants, efforts have been made to provide the largest possible structural space for the lateral impact protection. At a predefined vehicle width, the problem that exists that the distance of the seat longitudinal side to the vehicle side wall or vehicle door is restricted increasingly strongly, whereby comfortable actuation of the levers or hand wheels is made increasingly more difficult.

It is at least one object to provide a backrest adjustment device for a vehicle seat or a vehicle bench seat, in particular for a motor vehicle seat or a motor vehicle bench seat, which, on the one hand, does not more strongly restrict the structural width of the vehicle seat and, on the other hand, is easily producible. In addition, at least one object is to provide a backrest part for a vehicle seat or a vehicle bench seat, in particular for a motor vehicle seat or a motor vehicle bench seat, which, on the one hand, has a small structural width and, on the other hand, is easily producible. Furthermore, at least another object of providing a motor vehicle seat for a motor vehicle bench seat, which, on the one hand, has a small structural width and, on the other hand, is easily producible. Moreover, other objects, desirable features and characteristics will become apparent from the subsequent summary and detailed description, and the appended claims, taken in conjunction with the accompanying drawings and this background.

SUMMARY

One embodiment relates to a backrest adjustment device for a vehicle seat or a vehicle bench seat, in particular for a motor vehicle seat or a motor vehicle bench seat, in which a backrest part is connected to a seat part via an adjustment and fixing device, which has a fixing, which is disengaged for the inclination adjustment of the backrest part, the fixing of the adjustment and fixing device being disengaged by an electromechanical actuator. In this embodiment, the actuating lever or the hand wheel on the seat can be dispensed with, which is used according to the prior art for disengaging the locking of the position of the backrest part. The space required for the backrest part in the width is thus decreased. The backrest adjustment device is preferably provided for motor vehicle seats or motor vehicle bench seats, but is also suitable for other vehicles, such as aircraft or boats.

In an embodiment, the electrical terminals that are already provided in the vehicle seat, for example, the terminals for a seat heater are used for the power supply of the electromechanical actuator. In an embodiment of the backrest adjustment device, the fixing of the adjustment and fixing device is disengaged and fixed by an electromechanical actuator. In other words, on the one hand, by the electromechanical actuator, the fixing is disengaged so that a vehicle occupant can change the inclination of the backrest part and, on the other hand, the desired inclination is locked therewith.

In a further embodiment of the backrest adjustment device, the inclination of the backrest part is set by an electromechanical actuator. In this embodiment, the backrest part itself is adjusted in inclination by the electromechanical actuator, where pivoting by hand is not necessary. The backrest adjustment device is preferably integrated in an electrical seat adjustment system, a further adjustment of the vehicle seat, in particular a longitudinal adjustment and a vertical adjustment of the seat, but also an inclination adjustment of the seat part, an adaptation of a lumbar support, an adaptation of a thigh support, and/or an adaptation of a lateral support, being able to be performed electrically. In a further embodiment of the backrest adjustment device, the electromechanical actuator has a positioning motor. The use of a positioning motor allows reliable and precise actuation of the fixing.

In a further embodiment of the backrest adjustment device, the electromechanical actuator acts on the fixing via a Bowden cable unit, preferably with an adjustment lever interconnected. A mechanical movement of the electromechanical actuator can be transmitted relatively easily to the fixing reliably and in a technically simple manner by the Bowden cable, the Bowden cable preferably actuating an adjustment lever, which can transfer the fixing from a locked position into a disengaged position. An actuating force can therefore be transmitted reliably from an actuator to the fixing, on the one hand, and technically simple and cost-effective production is possible, on the other hand.

In a further embodiment of the backrest adjustment device, the adjustment and fixing device has at least one joint fitting, preferably two joint fittings, which have a fixed joint component assigned to the seat part and a pivotable joint component assigned to the backrest part, which are connected to one another via a pivot axis, a specific position of the pivotable joint component to the fixed joint component being fixed or disengaged by the fixing. In a further embodiment of the backrest adjustment device, the joint components are implemented as integrated parts of a frame for the backrest part and/or as integrated parts of a frame for the seat part, or preferably as separate components, which are fastened on the backrest part and/or seat part or on their frame.

In a further embodiment of the backrest adjustment device, the adjustment and fixing device has a backrest adjustment shaft, which is disengaged or disengaged and fixed by the fixing. This implementation causes secure and stable locking of the backrest part and allows its pivoting upon disengagement by the fixing using technically simple methods.

In a further embodiment of the backrest adjustment device, the adjustment and fixing device has at least two joint fittings, which each have a fixed joint component assigned to the seat part and a pivotable joint component assigned to the backrest part, the joint components being connected to one another via a pivot axis, a specific position of the pivotable joint component to the fixed joint component being fixed or disengaged by the fixing, and the backrest adjustment shaft transmitting a torque of one joint fitting to the other joint fitting.

In another embodiment of the backrest adjustment device, the adjustment and fixing device can be actuated with an actuating part, which activates the electromechanical actuator. In this embodiment, the adjustment and fixing device can preferably also be manually actuated; however, a hand lever or hand wheel for manual actuation is omitted. In this embodiment, joint fittings and an adjustment shaft are preferably used, which are also provided for a manually-actuated adjustment of the backrest part. The existing components of a known seat structure are thus advantageously used, the manual actuation being replaced by the electromechanical actuator.

In a further embodiment of the backrest adjustment device, the electromechanical actuator is arranged in the upper area of the backrest part, preferably on or between elements of a support structure for a headrest. The electromechanical actuator is preferably securely arranged without external alterations of a predefined vehicle seat in the seat structure in the upper area of the seat. The seat contour is thus not changed, and the seat comfort is not decreased. In a further embodiment of the backrest adjustment device, the actuation of the electromechanical actuator is performed by an actuating part, which is connected via an electrical line to the electromechanical actuator. The selection of the location for the actuating part is therefore substantially independent of the proximity to the electromechanical actuator and can be freely selected according to ergonomic aspects.

In a further embodiment of the backrest adjustment device, the actuating part is arranged in the vehicle interior, preferably on a central console, an armrest device in the area of a vehicle door, or an armrest device in the middle area between two vehicle seats. Through the arrangement in the vehicle interior in the area of the central console or the armrest devices, the actuating part for the backrest adjustment is better reachable than in the lateral, lower area of the vehicle seat. This arrangement is advantageous in particular in vehicles having a lesser vehicle width.

One embodiment relates to a backrest part for a vehicle seat or a vehicle bench seat, preferably for a motor vehicle seat or a motor vehicle bench seat, the backrest part being adjustable and fixable using a backrest adjustment device. Comfort requirements for a modern vehicle seat or a bench seat can be fulfilled using the backrest part, already provided seat designs being able to be maintained. These are supplemented with an electromechanical actuator and preferably with a Bowden cable unit, which act on the existing locking element. Easy and cost-effective integration of an electromechanical actuation in vehicle seats which can be actuated by hand is therefore possible. An actuating part is preferably connected to the actuator via an electrical connection line, the actuating part being arranged according to ergonomic aspects in the vehicle interior and therefore being better reachable and better operable than a hand lever or hand wheel arranged laterally on the seat.

One embodiment relates to a motor vehicle seat or a motor vehicle bench seat, having a backrest adjustment device or having a backrest part. The vehicle occupant can adapt the backrest inclination comfortably and simply to his anatomy using the backrest adjustment device.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
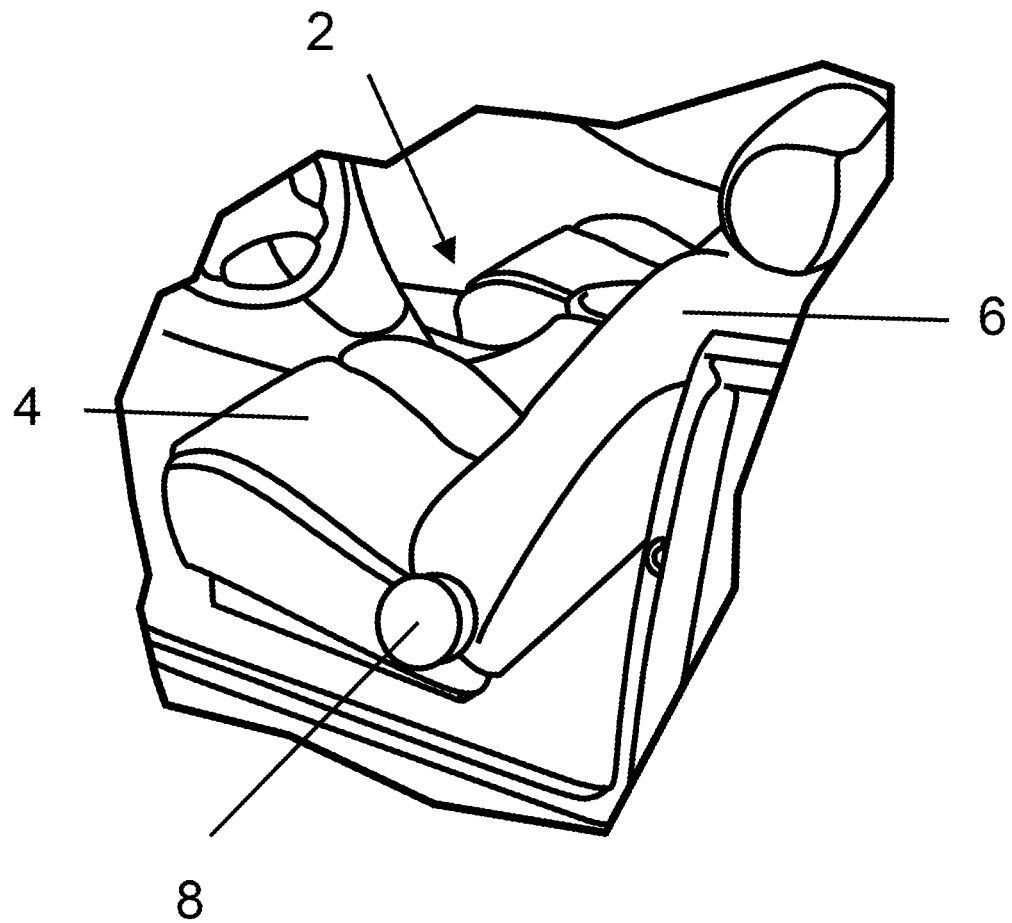
FIG. 1 shows a perspective view of a motor vehicle seat having hand wheel for inclination adjustment of the backrest part according to the prior art.

FIG. 1 shows a perspective view of a motor vehicle seat 2 according to the prior art. The motor vehicle seat 2 has a seat part 4 and a backrest part 6. The backrest part 6 is adjustable in the inclination in relation to the seat part 4, in order to adapt the vehicle seat 2 to the anatomy of the occupant. The inclination adjustment and locking is performed by a hand wheel 8, which is arranged laterally on the vehicle seat 2. The arrangement of the hand wheel 8 requires space, whereby the actuation of the backrest adjustment is made more difficult. A perspective view of the backrest part 6 according to the prior art of FIG. 1 in the lower area is shown in FIG. 2.

Figure 2:
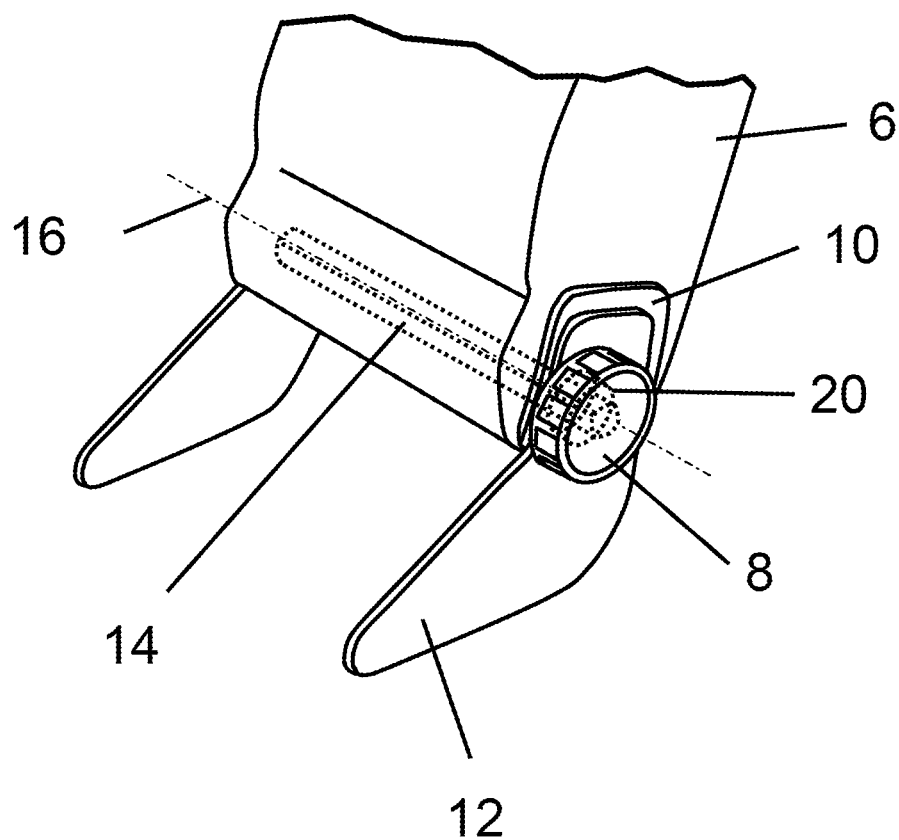
FIG. 2 shows a perspective view of the backrest part of FIG. 1 in the lower area.

As shown in FIG. 2, to fix and adjust the inclination of the backrest part 6, a joint fitting is provided, having a pivotable joint component 10, which is fastened on the backrest part 6, and a fixed joint component 12, on which the seat part 4 (not shown here) is fastened. The pivotable joint component 10 is pivotable around a rotational axis 16 in relation to the fixed joint component 12 by a backrest adjustment shaft 14. The hand wheel 8 acts on a fixing 20, using which the adjustment shaft 14 is lockable and unlockable. By actuating the hand wheel 8, the fixing 20 of the backrest adjustment shaft 14 is disengaged, whereby the backrest part 6 is adjustable in inclination.

Figure 3:
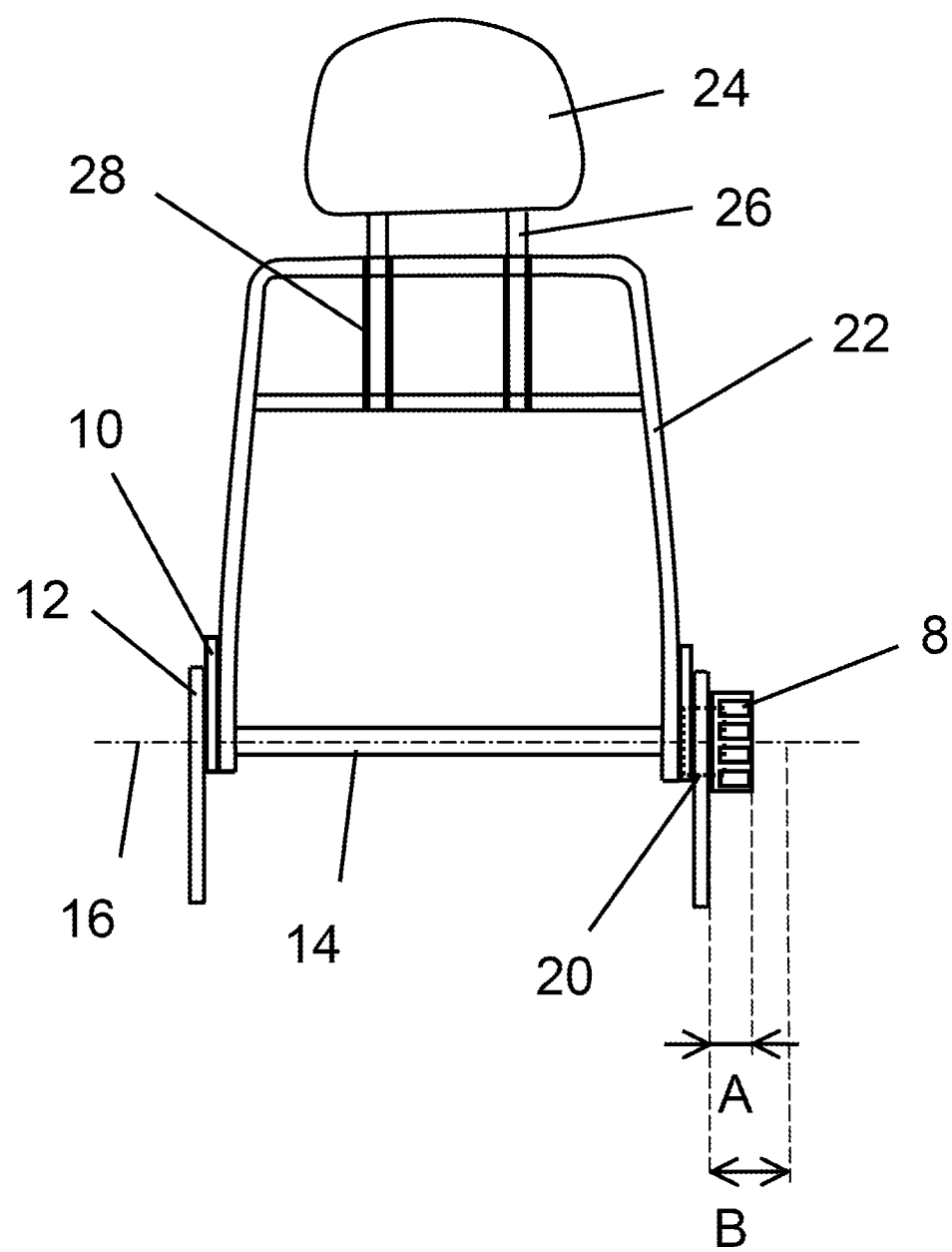
FIG. 3 shows a front view of the backrest structure of the backrest part of FIG. 2.

FIG. 3 shows a front view of the backrest support structure 22 of the backrest part 6 according to the prior art of FIG. 2. The backrest part 6 has a headrest 24, whose headrest support parts 26 are attached via a support part attachment 28 to the backrest support structure 22. The arrangement of the hand wheel 8 requires space. The parts of the vehicle in the area of the side door on the vehicle seat 2 must have at least the distance A to the fixed joint component 12. In order that the vehicle occupant can comfortably operate the hand wheel, a further distance to the laterally adjoining vehicle parts is necessary. Overall, a distance B is therefore necessary. These space requirements compete with those of other functional parts of the vehicle in this area of the vehicle seat.

Figure 4:
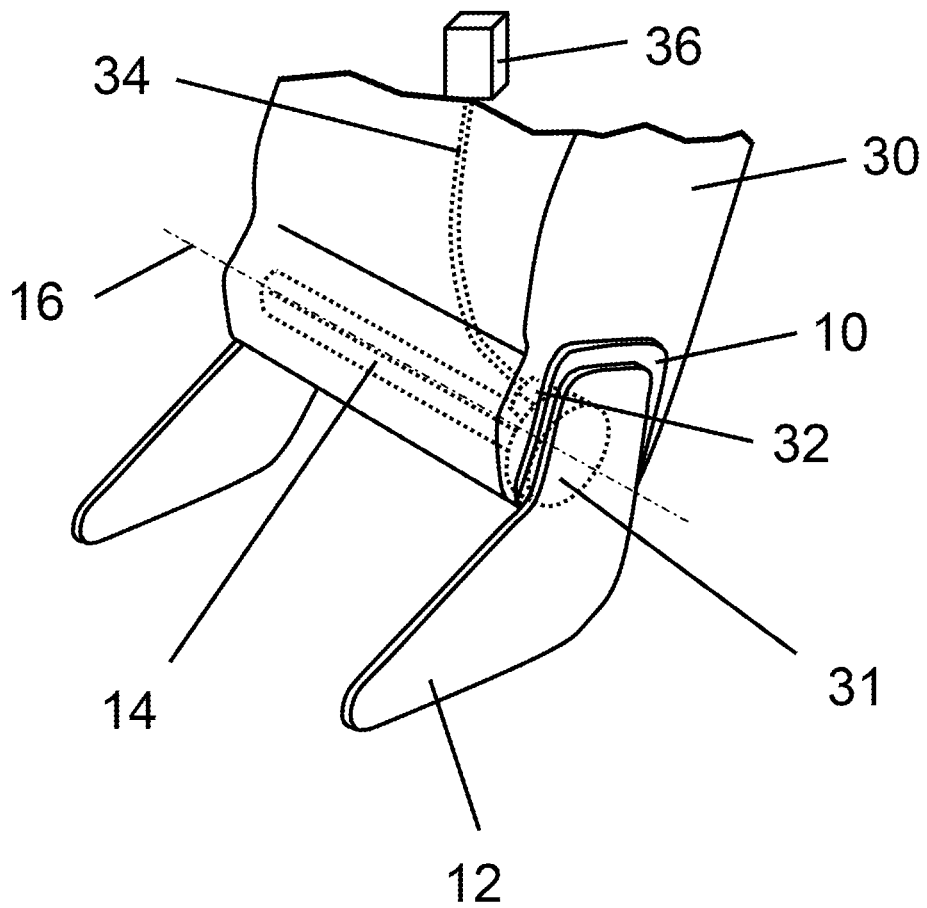
FIG. 4 shows a perspective view of a backrest part having an embodiment of the backrest adjustment device.

FIG. 4 shows an embodiment of a backrest part 30 having a backrest adjustment device according to an embodiment. The same reference numerals are used here and in the following figures for the same parts as in FIG. 1 to FIG. 3. The inclination adjustment of the backrest part 30 is made possible by a setting fitting, which has a pivotable joint component 10 fastened on the backrest part 30 and a fixed joint component 12 fastened on the seat part (not shown here). The backrest part 30 is pivotable around a rotational axis 16 using a backrest adjustment shaft 14 by disengaging a fixing 31. The disengagement of the fixing 31 is performed via an adjustment lever 32, which is actuated via a Bowden cable system 34 by an electromechanical actuator 36. Locking of the backrest adjustment shaft 14 can be performed without a hand wheel arranged laterally on the vehicle seat or a hand lever by the electromechanical actuating device.

Figure 5:
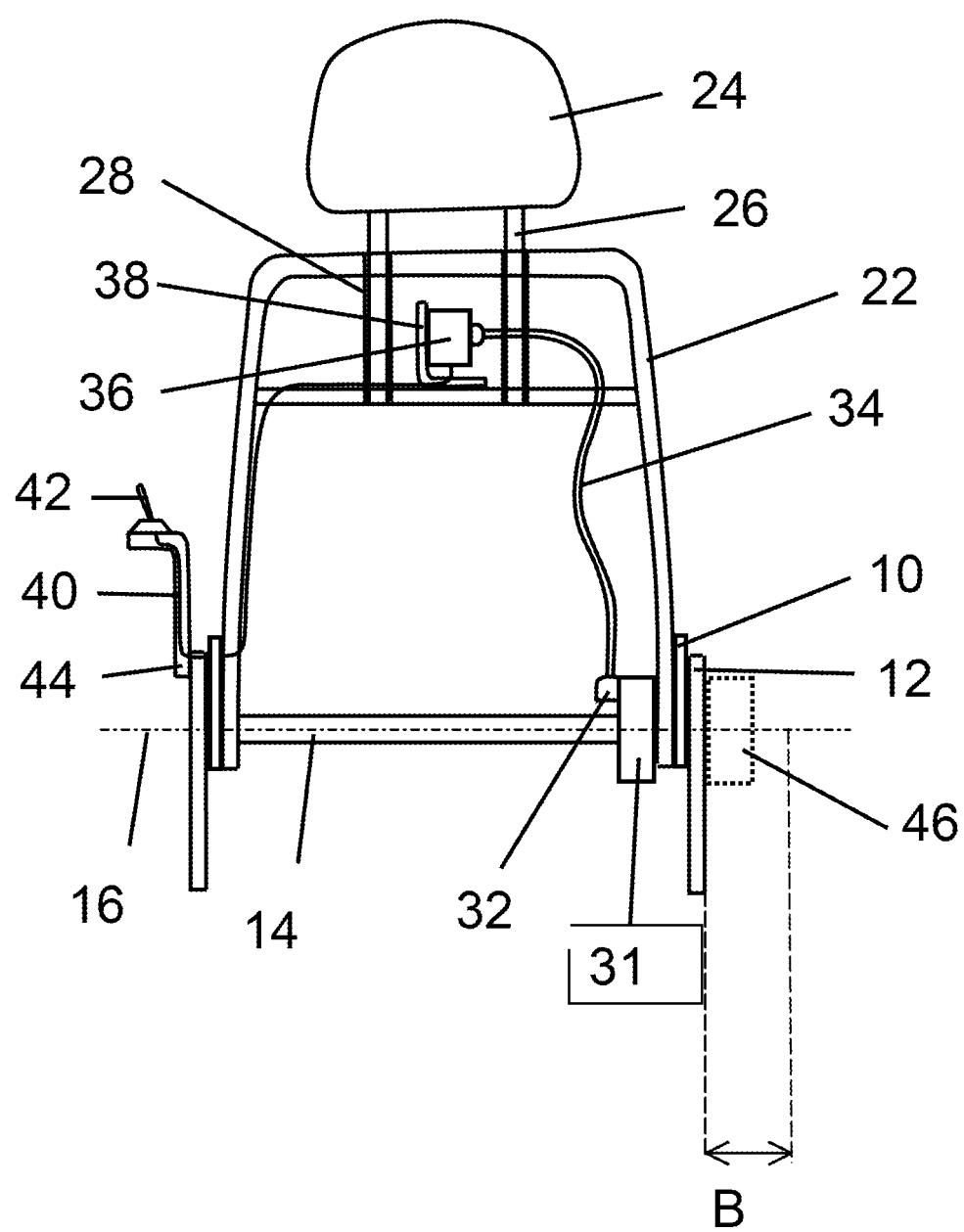
FIG. 5 shows a front view of a backrest structure of the backrest part of FIG. 4.

FIG. 5 shows a frontal view of the backrest support structure 22 of the backrest part 30 having the backrest adjustment device of FIG. 4. A support part attachment 28 for supporting parts 26 of a headrest 24 are integrated in the backrest support structure 22 of the backrest part 6. This structure accommodates an actuator support part 38, which carries the electromechanical actuator 36. The actuator 36 is connected via an electrical line to an actuating part 42. The actuating part 42 is arranged on an actuating part carrier 44, for example, in the area of an armrest between the front seats of a motor vehicle.

Through the backrest adjustment device, the structural space required for the hand wheel 8 is saved, whose indicated contour is shown for clarification by a dashed line in FIG. 5. The parts of the vehicle in the area of the side door can extend up to the vehicle seat 2 and thus occupy a structural space which is larger by the distance B than the manual actuation according to the prior art. Larger dimensions of occupant protection systems, such as side airbags, are therefore possible, without enlarging the overall width of the motor vehicle. In addition, the operating unit for the backrest adjustment device can be optimally positioned according to ergonomic aspects for the occupants.

Figure 6:
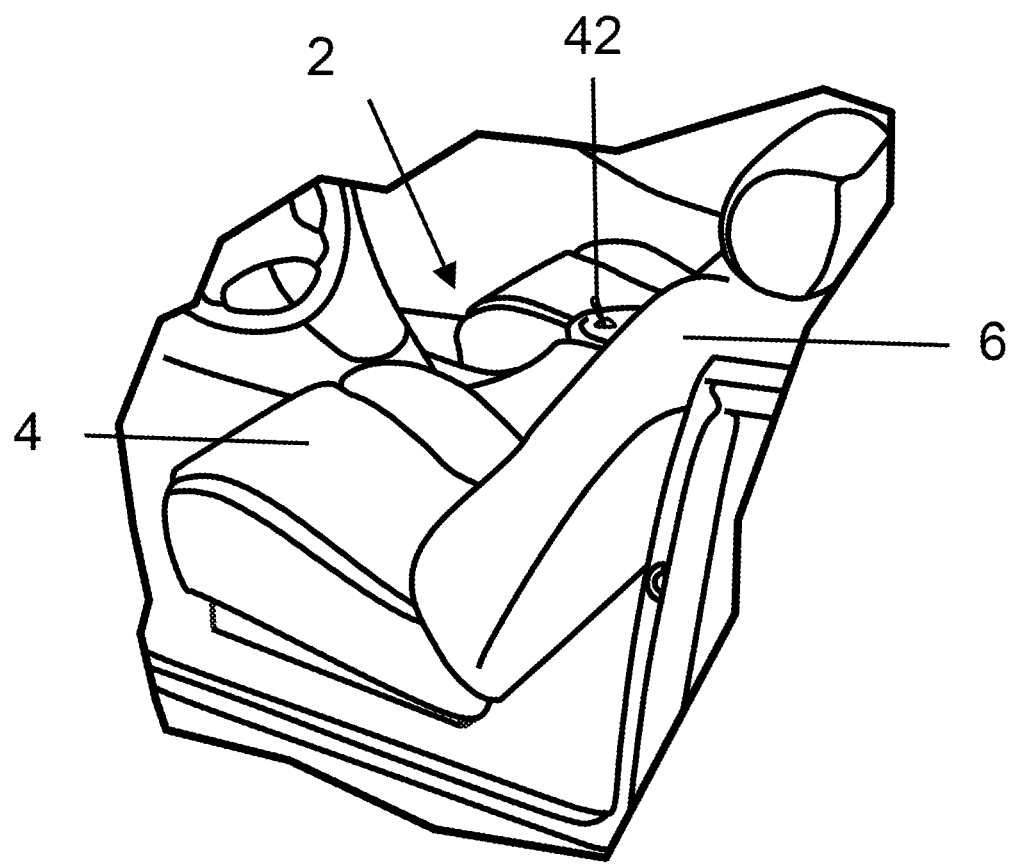
FIG. 6 shows a perspective view of a motor vehicle seat having the backrest adjustment device.

FIG. 6 shows a motor vehicle seat having the backrest adjustment device. The actuation of the inclination adjustment of the backrest part 30 is performed here comfortably in the area of a central armrest between the vehicle seats by the actuating part 42. The described device can similarly be used for a backrest part of a vehicle seat or a vehicle bench seat.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A backrest adjustment device for a vehicle seat for a motor vehicle, comprising:
    a seat part;
    an adjustment and fixing device, comprising:
        fixing means;
        an adjustment lever coupled to the fixing means;
        a Bowden cable system that is coupled to the adjustment lever and configured to actuate the adjustment lever; and
        an electromechanical actuator that is operationally linked to the adjustment lever via the Bowden cable system; and
    a backrest part connected to the seat part via the adjustment and fixing device, wherein an inclination of the backseat part is adjustable, wherein the Bowden cable system and the electromechanical actuator are disposed within the backrest part, and wherein the electromechanical actuator is configured to actuate disengagement of the fixing means during an inclination adjustment of the backrest part by actuating the adjustment lever via the Bowden cable.

2. The backrest adjustment device according to claim 1, wherein the fixing means is configured to be disengaged and fixed via the electromechanical actuator.

3. The backrest adjustment device according to claim 1, wherein the electromechanical actuator is configured to set an inclination of the backrest part.

4. The backrest adjustment device according to claim 3, wherein the electromechanical actuator includes a positioning motor.

5. The backrest adjustment device according to claim 1, wherein the adjustment and fixing device further comprises:
    at least one joint fitting, comprising:
        a fixed joint component assigned to the seat part; and
        pivotable joint component assigned to the backrest part, wherein the fixed joint component and the pivotable joint component are connected via a pivot axis, wherein a specific position of the pivotable joint component with respect to the fixed joint component is able to be fixed or disengaged.

6. The backrest adjustment device according to claim 5, wherein the fixed joint component and the pivotable joint component are integrated parts of a frame for the backrest part.

7. The backrest adjustment device according to claim 5, wherein the fixed joint component and the pivotable joint component are integrated parts of a frame for the seat part.

8. The backrest adjustment device according to claim 1, wherein the adjustment and fixing device further comprises:
    a backrest adjustment shaft that is configured to be disengaged by the fixing means.

9. The backrest adjustment device according to claim 8, wherein the adjustment and fixing device further comprises:
    at least two joint fittings, comprising:
        a fixed joint component assigned to the seat part; and
        a pivotable joint component assigned to the backrest part,
        wherein the fixed joint component and the pivotable joint component are connected via a pivot axis, wherein a specific position of the pivotable joint component with respect to the fixed joint component is able to be fixed or disengaged, and a torque of one joint fitting transmittable via the backrest adjustment shaft to another joint fitting.

10. The backrest adjustment device according to claim 1, wherein the adjustment and fixing device is actuated by an actuating part that activates the electromechanical actuator.

11. The backrest adjustment device according to claim 1, wherein the electromechanical actuator is arranged in an upper area of the backrest part.

12. The backrest adjustment device according to claim 1, wherein the electromechanical actuator is arranged between elements of a support structure for a headrest.

13. The backrest adjustment device according to claim 1, wherein the electromechanical actuator is actuated by an actuating part, which is connected via an electrical line to the electromechanical actuator.

14. The backrest adjustment device according to claim 13, wherein the actuating part is arranged on a central console.

* * * * *